United States Patent [19]

Wong

[11] Patent Number: 5,756,606
[45] Date of Patent: May 26, 1998

[54] MEANS TO CONTROL PARTICLE SIZE AND ELIMINATE FOULING IN THE SYNTHESIS OF SYNDIOTACTIC 1,2 - POLYBUTADIENE

[75] Inventor: Tang Hong Wong, Hudson, Ohio

[73] Assignee: The Goodyear Tire & Rubber Company, Akron, Ohio

[21] Appl. No.: 861,668

[22] Filed: May 22, 1997

[51] Int. Cl.$^6$ ............................... C08F 2/16; C08F 36/06
[52] U.S. Cl. ...................... 526/94; 526/91; 526/93; 526/139; 526/140; 526/141; 526/142; 526/151; 526/191; 526/220; 526/233; 526/234; 526/235; 526/335; 526/912
[58] Field of Search ........................ 526/91, 93, 94, 526/140, 141, 142, 151, 235, 139, 191, 220, 233, 234

[56] References Cited

U.S. PATENT DOCUMENTS

| | | | |
|---|---|---|---|
| 3,778,424 | 12/1973 | Shotaro Sugiura et al. | 260/94.3 |
| 3,901,868 | 8/1975 | Ueno et al. | 526/93 |
| 4,153,767 | 5/1979 | Ueno et al. | 526/141 |
| 4,274,462 | 6/1981 | Ogawa et al. | 152/209 |
| 4,394,473 | 7/1983 | Winter et al. | 524/226 |
| 4,429,085 | 1/1984 | Henderson et al. | 526/92 |
| 4,751,275 | 6/1988 | Witte et al. | 526/139 |
| 4,790,365 | 12/1988 | Sandstrom et al. | 152/510 |
| 4,902,741 | 2/1990 | Burroway et al. | 524/836 |
| 4,957,970 | 9/1990 | Holsapple et al. | 525/99 |
| 5,011,896 | 4/1991 | Bell et al. | 526/92 |
| 5,021,381 | 6/1991 | Burroway et al. | 502/117 |
| 5,346,971 | 9/1994 | Hongyo et al. | 526/93 X |
| 5,405,816 | 4/1995 | Burroway | 502/108 |
| 5,677,400 | 10/1997 | Tsujimoto et al. | 526/93 X |

*Primary Examiner*—Fred Teskin
*Attorney, Agent, or Firm*—Alvin T. Rockhill

[57] ABSTRACT

Syndiotactic 1,2-polybutadiene is a thermoplastic resin which has double bonds attached in an alternating fashion to its polymeric backbone. Films, fibers and molded articles can be made utilizing syndiotactic 1,2-polybutadiene. It can also be blended into rubbers and cocured therewith. It is generally preferred to synthesize syndiotactic 1,2-polybutadiene in an aqueous medium by suspension or emulsion polymerization. In such aqueous polymerization techniques reactor fouling and particle size control problems are frequently encountered. This invention is based upon the unexpected finding that reactor fouling can be greatly reduced or eliminated and that particle size can be regulated by conducting such aqueous polymerizations in the presence of a controlled amount of dissolved oxygen which is within the range of about 0.01 ppm to about 4 ppm. This invention more specifically discloses a process for preparing syndiotactic 1,2-polybutadiene in an aqueous medium with minimal reactor fouling which comprises polymerizing 1,3-butadiene monomer in the aqueous medium in the presence of (1) a catalyst system which is comprised of (a) transition metal compound, (b) an organoaluminum compound and (c) at least one member selected from the group consisting of carbon disulfide, phenyl isothiocyanate and xanthic acid and (2) from about 0.01 ppm to about 4 ppm of oxygen.

20 Claims, No Drawings

MEANS TO CONTROL PARTICLE SIZE AND ELIMINATE FOULING IN THE SYNTHESIS OF SYNDIOTACTIC 1,2 - POLYBUTADIENE

BACKGROUND OF THE INVENTION

Syndiotactic 1,2-polybutadiene (SPBD) is a thermoplastic resin which can be utilized in making films, fibers and molded articles. For example, U.S. Pat. Nos. 4,394,473 and 4,957,970 disclose the use of SPBD in making bags and packaging. It can also be blended into elastomers, such as polydiene rubbers. Because SPED contains double bonds which are attached in an alternating fashion to its backbone, it can be cocured with the rubbers in such blends. In fact, SPBD/rubber blends provide a unique combination of properties which make them useful in various tire compounds.

U.S. Pat. No. 4,790,365 discloses that incorporation of SPBD into rubber compositions which are utilized in the supporting carcass or innerliner of tires greatly improves the green strength of those compositions. Electron beam precure (microwave precure) is a technique which has gained wide commercial acceptance as a means of improving the green strength of synthetic elastomers which are used in building tires. However, electron beam precure techniques are costly. The incorporation of SPBD into blends of such synthetic elastomers can often improve green strength to the degree that electron beam precure is not required. The incorporation of SPBD into halogenated butyl rubbers which are utilized as the innerliner compositions for tires also greatly improves the scorch safety of such compositions. U.S. Pat. No. 4,274,462 disclosed that pneumatic tires having improved resistance against heat build-up can be prepared by utilizing SPBD fibers in their tread base rubber.

According to U.S. Pat. No. 4,790,365, the SPBD utilized in making the supporting carcass for tires has a melting point which is within the range of 120° C. to 190° C. and that it is preferred for the SPBD utilized in making the supporting carcass to have a melting point which is within the range of 150° C. to 165° C. The SPBD utilized in making tire innerliners has a melting point which is within the range of 120° C. to 160° C. and preferably has a melting point which is within the range of 125° C. to 150° C. The melting points referred to herein are minimum endotherm values determined from DSC (differential scanning calorimetry) curves.

Techniques for preparing SPBD by polymerizing 1,3-butadiene monomer are well known in the art. These techniques include solution polymerization, suspension polymerization and emulsion polymerization. The SPBD made utilizing these techniques typically have a melting point within the range of about 195° C. to about 215° C. It is accordingly necessary to reduce the melting point of the SPBD to render it suitable for utilization in some applications.

A process is disclosed in U.S. Pat. No. 3,778,424 for the preparation of syndiotactic 1,2-polybutadiene which comprises polymerizing 1,3-butadiene in an organic solvent in the presence of a catalyst composition composed of:

(a) a cobalt compound, (b) an organoaluminum compound of the formula $AlR_3$, in which R is a hydrocarbon radical of 1–6 carbons and (c) carbon disulfide.

U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-β-diketone complex, (ii) cobalt-βketo acid ester complex, (iii) cobalt salt of organic carboxylic acid and (iv) halogenated cobalt-ligand compound complex and an organoaluminum compound, (b) preparing a catalyst composition by mixing the catalyst component solution (prepared in step a) with an alcohol, ketone or aldehyde compound and carbon disulfide, (c) providing a polymerization mixture containing desired amounts of 1,3-butadiene, the catalyst composition and an inert organic solvent and (d) polymerizing 1,3-butadiene at a temperature which is within the range of −20° C. to 90° C.

U.S. Pat. No. 3,901,868 indicates that the melting point of the SPBD produced varies in response to the proportion of alcohol, ketone or aldehyde in the polymerization mixture. U.S. Pat. No. 4,153,767 shows that amide compounds, such as N,N-dimethylformamide, can be used in solution polymerizations to reduce the melting point of SPBD being synthesized.

U.S. Pat. No. 4,429,085 discloses a process for producing syndiotactic 1,2-polybutadiene by suspension polymerization in an aqueous medium. In this aqueous polymerization process, polybutadiene which has an essentially syndiotactic 1,2-microstructure is made by the steps of:

(A) preparing a catalyst component solution by dissolving, in an inert organic solvent containing 1,3-butadiene (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture and (D) polymerizing said 1,3-butadiene in said polymerization mixture into polybutadiene while agitating said polymerization mixture.

U.S. Pat. No. 4,751,275 discloses a process for the preparation of SPBD by the solution polymerization of 1,3-butadiene in a hydrocarbon polymerization medium, such as benzene, toluene, cyclohexane or n-hexane. The catalyst system used in this solution polymerization contains a chromium-III compound which is soluble in hydrocarbons, a trialkylaluminum compound and a dialkylphosphite, such as di-neopentylphosphite or di-butylphosphite.

U.S. Pat. No. 4,902,741 and U.S. Pat. No. 5,021,381 disclose a process for preparing a syndiotactic 1,2-polybutadiene latex by emulsion polymerization which comprises polymerizing 1,3-butadiene monomer in an aqueous reaction mixture which is comprised of (1) water, (2) at least one emulsifier, (3) 1,3-butadiene monomer, (4) a catalyst emulsion composition which is prepared by dissolving in an inert organic solvent containing at least one polyene (a) at least one cobalt compound selected from the group consisting of (i) β-ketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant and water to an average particle size which is within the range of about 10 nanometers to about 1000 nanometers and (5) at least one member selected from the group consisting of carbon disulfide and phenyl isothiocyanate.

The synthesis of SPBD in an aqueous medium offers several important advantages over solution polymerizations. Water, as a medium in which to carry out such a polymerization, is less expensive, more easily purified and has a higher heat capacity. Conducting such polymerizations in an aqueous medium also permits for higher monomer and higher solids concentrations because of the lower viscosity of a polymer suspension or emulsion compared with that of a polymer solution. The main drawback associated with aqueous suspension and emulsion polymerizations for producing SPBD is the difficulty associated with reducing the melting point of the SPBD. In other words, it is difficult to control the chemical structure and hence the crystallinity and melting point of SPBD which is synthesized in an aqueous medium. Even though numerous modifiers can be used to reduce the level of crystallinity and resulting melting point of SPBD which is synthesized in solution, there are few efficient modifiers for reducing the crystallinity of SPBD which is synthesized in an aqueous medium.

U.S. Pat. No. 5,011,896 discloses the use of 4-(alkylamino)benzaldehydes, 4-(dialkylamino) benzaldehydes, 2,4-di-(alkoxy)benzaldehydes, 2,6-di-(alkoxy)benzaldehydes, 2,4,6-tri-(alkoxy)benzaldehydes and 4-(1-azacycloalkyl)benzaldehydes as modifiers for reducing the melting point of SPBD which is synthesized in an aqueous medium. U.S. Pat. No. 5,405,816 discloses the utilization of N,N-dibutylformamide as a highly effective modifier for reducing the melting point of SPBD synthesized in such polymerizations.

SUMMARY OF THE INVENTION

There are two major technical difficulties in utilizing aqueous polymerization techniques, such as suspension polymerization or emulsion polymerization, in the synthesis of SPBD. These problems are reactor fouling and particle size control. This invention provides a solution to both of these problems.

Reactor fouling is the undesirable build-up of polymer on baffles, agitators, agitator shafts and the walls of a polymerization reactor. It is, of course, necessary to clean this unwanted sludge out of the reactor on a continuing basis. This task of eliminating the fouling from a reactor is generally difficult and time consuming. Reactor fouling accordingly adversely affects productivity and the cost of operation.

Particle size affects the handling of the product, especially during the drying step. It is not desirable for the SPBD to have too large of a particle size or drying and handling is difficult. On the other hand, too small of a particle size can also lead to problems. For instance, small particles can form dust which is difficult to process and which can potentially be an explosive. This necessitates the use of costly equipment to ensure a safe operation.

This invention more specifically discloses a process for preparing syndiotactic 1,2-polybutadiene in an aqueous medium with minimal reactor fouling which comprises polymerizing 1,3-butadiene monomer in the aqueous medium in the presence of (1) a catalyst system which is comprised of (a) transition metal compound, (b) an organoaluminum compound and (c) at least one member selected from the group consisting of carbon disulfide, phenyl isothiocyanate and xanthic acid and (2) from about 0.01 ppm to about 4 ppm of oxygen.

The subject invention also reveals a process for preparing syndiotactic 1,2-polybutadiene in an aqueous medium with a minimal amount of reactor fouling which comprises polymerizing 1,3-butadiene monomer in an aqueous medium in the presence of (1) a catalyst composition which is made by reacting (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, (b) at least one organoaluminum compound of the formula $AlR_3$, wherein R represents a hydrocarbon radical of 1 to 6 carbon atoms and (c) at least one conjugated diene; (2) at least one member selected from the group consisting of carbon disulfide, phenyl isothiocyanate and xanthic acid; and (3) from about 0.01 ppm to about 4 ppm of oxygen.

The oxygen level in the polymerization medium will normally be adjusted so as to be within the range of about 0.01 ppm to about 4 ppm by the addition of an oxygen scavenger, such as sodium hydrosulfite. However, the oxygen level in the polymerization medium can also be adjusted so as to be within the desired range by sparging the aqueous polymerization medium with an inert gas, such as nitrogen.

DETAILED DESCRIPTION OF THE INVENTION

The SPBD made in accordance with the techniques of this invention normally has more than about 70 percent of its monomeric units in a syndiotactic 1,2-configuration. In most cases, the SPBD made by the process of this invention will have from about 75 percent to about 95 percent of its monomeric units in a syndiotactic 1,2-configuration.

In practicing this invention, SPBD is synthesized utilizing aqueous suspension polymerization techniques or emulsion polymerization techniques. The catalyst system and general procedure needed for polymerizing 1,3-butadiene monomer into SPBD is described in U.S. Pat. No. 4,429,085. Such suspension polymerization techniques can be utilized in practicing this invention and the teachings of U.S. Pat. No. 4,429,085 are incorporated herein by reference in their entirety. A useful technique for preparing SPBD by emulsion polymerization is described in U.S. Pat. No. 4,902,741 and U.S. Pat. No. 5,021,381. The emulsion polymerization procedures described therein can be utilized in the practice of this invention and the teachings of U.S. Pat. No. 4,902,741 and U.S. Pat. No. 5,021,381 are accordingly incorporated herein by reference in their entirety.

In practicing this invention, 1,3-butadiene monomer is polymerized in an aqueous medium by suspension or emulsion polymerization techniques in the presence of a controlled amount of oxygen. It is important for the amount of oxygen dissolved in the aqueous polymerization medium to be within the range of about 0.01 ppm to about 4 ppm. The abbreviation "ppm" as used herein stands for "parts per million."

If more than about 4 ppm of oxygen is dissolved in the aqueous polymerization medium, reactor fouling can occur. Thus, it is critical for the oxygen level in the aqueous polymerization medium to be no more than about 4 ppm. It is typically preferred for the aqueous polymerization medium to contain from about 0.05 ppm to about 1 ppm of dissolved oxygen. It is generally more preferred for the polymerization to contain from about 0.1 to about 0.3 ppm of oxygen.

It is desirable for a small amount of oxygen to be dissolved in the aqueous polymerization medium for particle formation to occur. In cases where the amount of oxygen dissolved in the aqueous polymerization medium is low, particles which are too small to be optimal will typically form. In order to attain SPBD particles which are of a desirable particle size which can be easily processed, the amount of oxygen dissolved in the aqueous polymerization medium will typically be at least about 0.1 ppm. In cases where particle size control is important, there should generally be from about 0.1 ppm to about 4 ppm of oxygen dissolved in the aqueous polymerization medium. In such cases it is normally preferred for 0.1 ppm to 1 ppm of oxygen to be present in the aqueous polymerization medium with it being most preferred for 0.1 ppm to 0.3 ppm of oxygen to be present in the aqueous polymerization medium.

The oxygen level in the polymerization medium will normally be adjusted so as to be within the desired range by the addition of an oxygen scavenger, such as sodium hydrosulfite. However, the oxygen level in the polymerization medium can also be adjusted so as to be within the desired range by sparging the aqueous polymerization medium with an inert gas. Nitrogen and Noble gases, such as helium, neon, argon and krypton are representative examples of inert gases which can be used for this purpose. It is typically preferred to use nitrogen for economic reasons.

A wide variety of oxygen scavengers can be used to reduce the level of oxygen in the aqueous polymerization medium into the desired range. Some representative examples of oxygen scavengers which can be used include sulfites, hydrogen sulfites, dithionates, hydroquinone, catechol, resorcinol, hydrazine, pyrogallol, gallate, ascorbic acid, ascorbate, isoascorbic acid, isoascorbate, glucose, lignin, dibutylhydroxytoluene, butylhydoxylanisole, ferrous salts, metal powders, sodium thiosulfate, sodium alum, disodium hydrogen phosphate, activated clay, mordenite, hydroxylamine, diethylhydroxylamine, thiourea, and the like. Alkali metal sulphites and alkali metal sulfates are preferred classes of oxygen scavengers. Some representative examples of preferred oxygen scavengers include sodium sulfite, sodium thiosulfite, sodium hydrosulfite, sodium thiosulfate, and sodium metabisulfite with sodium hydrosulfite being the most preferred. It is typically preferred for the oxygen scavenger to be water-soluble.

The oxygen level in the aqueous polymerization medium will typically be monitored as the medium is sparged or as the oxygen scavenger is being added. After the desired oxygen level is attained, the sparging or addition of oxygen scavenger is discontinued. It is often convenient to monitor the oxygen level in the aqueous polymerization medium by the use of an oxygen detector probe which is attached to a recirculation loop.

Melting-point regulators can be added to the aqueous polymerization medium to control the melting point and crystallinity of the SPBD being synthesized. Some representative examples of melting-point regulators which can be utilized include ketones, aldehydes, alcohols, esters, nitriles, sulfoxides, amides and phosphoric acid esters. In this aqueous polymerization process, there is a limitation of controlling crystallinity and melting point with agents which are water-soluble. Thus, ethanol and methanol are not as effective as other alcohols which are much less soluble in water than in hydrocarbons. In other words, water-soluble agents cannot be used as effectively to control crystallinity and melting point. A detailed description of melting-point regulators which can be used to control crystallinity and melting points is given in U.S. Pat. Nos. 3,901,868, 4,153,767, 5,011,896 and U.S. Pat. No. 5,405,816. The teachings of these patents are incorporated herein by reference in their entirety.

As has been pointed out, water-soluble melting-point regulators, such as methanol and ethanol, are not effective agents. Other alcohols, such as 2-ethyl-1-hexanol, 1-decanol and 5-tridecanol which are not soluble in water, can be used with better success.

The N,N-dibutylformamide (DBF) is highly preferred for utilization as a melting-point modifier in practicing this invention. DBF has the structural formula:

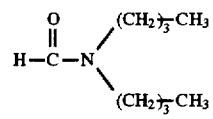

Lower N,N-dialkylformamides, such as N,N-dimethylformamide, N,N-diethylformamide and N,N-dipropylformamide, cannot be used as modifiers in such aqueous polymerizations because they hydrolyze in the aqueous polymerization mediums in which such suspension and emulsion polymerization are conducted. The use of higher N,N-dialkylformamides is not a commercially viable option because they are not very efficient and would need to be utilized in large quantities to attain a significant melting point reduction.

The aromatic aldehydes which can be utilized as modifiers in practicing this invention include (a) 4-(alkylamino)benzaldehydes, (b) 4-(dialkylamino)benzaldehydes, (c) 2,4-di-(alkoxy)benzaldehydes, (d) 2,6-di-(alkoxy)benzaldehydes, (e) 2,4,6-tri-(alkoxy)benzaldehydes and (f) 4-(1-azacycloalkyl)benzaldehydes. The 4-(alkylamino)benzaldehydes which can be utilized as modifiers have the structural formula:

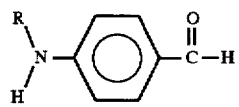

wherein R represents an alkyl group containing from about 1 to about 20 carbon atoms. It is preferred for such alkyl groups to contain from 4 to 8 carbon atoms.

The 4-(dialkylamino)benzaldehydes which can be utilized are of the structural formula:

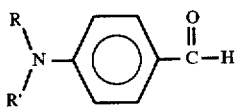

wherein R and R' can be the same or different and are alkyl groups which contain from 1 to 20 carbon atoms. It is preferred for R and R' to be alkyl groups which contain from 1 to about 8 carbon atoms.

The 2,4-di-(alkoxy)benzaldehydes which can be employed as melting-point regulators have the structural formula:

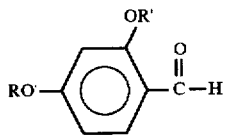

wherein R and R' can be the same or different and represent alkyl groups which contain from 1 to 20 carbon atoms. It is preferred for R and R' to represent alkyl groups which contain from 1 to 8 carbon atoms.

The 2,6-di-(alkoxy)benzaldehydes which can be utilized as melting-point regulators in the practice of this invention are of the structural formula:

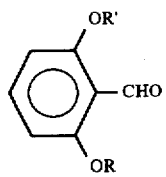

wherein R and R' can be the same or different and represent alkyl groups which contain from 1 to 20 carbon atoms. It is preferred for R and R' to represent alkyl groups which contain from 1 to 8 carbon atoms.

The 2,4,6-tri-(alkoxy)benzaldehydes which can be employed in the practice of this invention as melting-point modifiers have the structural formula:

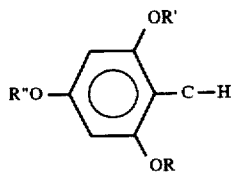

wherein R, R' and R" can be the same or different and represent alkyl groups containing from 1 to 20 carbon atoms. It is preferred for R, R' and R" to represent alkyl groups which contain from 1 to 8 carbon atoms.

The 4-(1-azacycloalkyl)benzaldehydes that can be utilized as melting-point regulators are of the general structural formula:

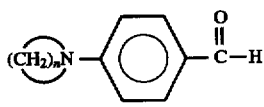

wherein n is an integer from 3 to about 8. It is preferred for n to be an integer from 4 to 6. In other words, it is preferred for the 4-(1-azacycloalkyl)benzaldehyde to be selected from the group consisting of 4-(1-azacyclobutyl)benzaldehyde,
4-(1-azacyclopentyl)benzaldehyde and
4-(1-azacyclohexyl)benzaldehyde.

In practicing this invention, standard suspension or emulsion polymerization techniques for synthesizing SPBD are carried out in the presence of 0.01 ppm to 4 ppm of oxygen. The amount of melting-point regulator utilized, if any, will depend upon the desired lower melting point for the SPBD being prepared. Naturally, the utilization of larger quantities of the melting-point regulator will cause the lower melting point of the SPBD being synthesized to be at a lower temperature. Thus, if SPBD having a greatly suppressed lower melting point is being sought, then a relatively large amount of the melting-point regulator will be utilized as a modifier in the polymerization. In cases where SPBD having a lower melting-point which is only slightly reduced is sought, a relatively low level of melting-point regulator will be needed.

As a general rule, the aqueous polymerization medium will contain from about 0.01 to about 2 phm (parts per hundred parts by weight of monomer) of the melting-point regulator. Usually from about 0.05 phm to about 1.25 phm of the melting-point regulator will be employed. In most cases where N,N-dibutylformamide is employed as the melting-point regulator, normally from about 0.1 phm to about 1.0 phm of the N,N-dibutylformamide will be utilized. To attain good conversions, less than about 0.5 phm and preferably less than about 0.25 phm of the N,N-dibutylformamide will be utilized. The table below shows the approximate relationship between conversion, melting point and the amount of N,N-dibutylformamide utilized as a melting-point regulator.

| Amount of N,N-dibutylformamide | Monomer Conversion | SPBD Melting Point |
| --- | --- | --- |
| 0 | 99% | 188° C. |
| 0.25 phm | 96% | 120° C. |
| 0.50 phm | 85% | 110° C. |
| 1.00 phm | 60% | 105° C. |
| 1.25 phm | 40% | 104° C. |

The polymerizations of this invention can optionally be carried out in the presence of a sodium halide salt or a potassium halide salt to produce SPBD having two melting points. The sodium halide salt or the potassium halide salt employed in the aqueous polymerization medium for such a purpose will typically be a fluorine, chlorine, bromine or iodine salt. It is normally preferred for the halide to be fluorine, chlorine or bromine with chlorine salts being the most preferred. Some representative examples of salts which can be utilized include sodium fluoride, sodium chloride, sodium bromide, potassium fluoride, potassium chloride and potassium bromide. Potassium halide salts are normally greatly preferred since their utilization results two melting points which are more distinct. Thus, potassium bromide, potassium fluoride and potassium chloride are preferred salts with potassium chloride being the most preferred.

In cases where sodium or potassium halide salts are employed in the aqueous polymerization medium, they will typically be present in an amount which is within the range of about 0.1 phr to about 20 phm. The sodium or potassium halide salt will more typically be present in the aqueous polymerization medium in an amount which is within the range of 0.5 phm to 10 phm. When they are utilized, it is normally preferred for the sodium halide salt or the potassium halide salt to be present in an amount which is within the range of 0.7 phm to about 5 phm with it being most preferred for the salt to be present in an amount which is within the range of 1 phr to 2 phm.

SUSPENSION POLYMERIZATION

The first step in the synthesis of SPBD by suspension polymerization involves the preparation of a catalyst component solution. The catalyst component solution is prepared by dissolving at least one cobalt compound and at least one organoaluminum compound in an inert organic solvent containing at least one conjugated diene which is dissolved therein.

The term "an inert organic solvent" used herein refers to an organic solvent chemically inert to all of the catalyst components, the emulsifier, the 1,3-butadiene and the SPBD. Some representative examples of inert organic solvents include aromatic hydrocarbons, aliphatic hydrocarbons, alicyclic hydrocarbons, halogenated aromatic hydrocarbons and mixtures of two or more of the above-mentioned compounds. Some representative examples of aromatic hydrocarbons that can be utilized include benzene, toluene, xylenes, ethylbenzene, diethylbenzene or isobutylbenzene. The aliphatic hydrocarbons which can be used include n-hexane, isohexanes, n-heptane, n-octane, isooctanes, n-decane, 2,2-dimethylbutane, petroleum ether, kerosene, petroleum spirit or petroleum naphtha. The alicyclic hydrocarbons that can be used include cyclohexane and methylcyclohexane. Some representative examples of halogenated aromatic hydrocarbons that can be used include chlorobenzene, dichlorobenzenes or trichlorobenzenes.

The cobalt compound usable for the process of the present invention is soluble in an inert organic solvent selected from the group consisting of (i) β-diketone compounds, (ii) β-keto acid ester complexes of cobalt, (iii) cobalt salts of organic carboxylic acids having 1 to 25 carbon atoms and (iv) complexes of halogenated cobalt compounds of the formula $CoX_n$ wherein X represents a halogen atom and n represents 2 or 3, with an organic compound selected from the group consisting of tertiary amines, alcohols, tertiary phosphines, ketones and N,N-dialkylamides.

The β-diketone compound which can be used to form a complex with a cobalt atom is of the formula:

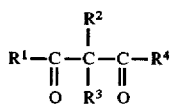

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (ii) acetylacetonate or cobalt (iii) acetylacetonate.

The β-keto acid ester which can be used to form a complex with a cobalt atom may be of the formula:

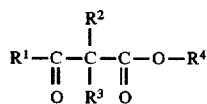

wherein $R^1$, $R^2$, $R^3$ and $R^4$ are the same as defined above. This type of cobalt complex may be a cobalt-acetoacetic acid ethyl ester complex.

Some representative examples of cobalt salts of organic carboxylic acids that can be used include cobalt octoate and cobalt naphthanate.

The organoaluminum compound usable for the process of the present invention is of the formula $AlR_3$ wherein R represents a hydrocarbon radical containing from 1 to 6 carbon atoms. The hydrocarbon radical may be an alkyl radical or a cycloalkyl radical containing from about 1 to about 6 carbon atoms. The hydrocarbon radical may also be an aryl radical. Preferably, the organoaluminum compound will be trimethylaluminum, triethylaluminum triisobutylaluminum or triphenylaluminum.

In the preparation of the catalyst component solution, it is important that the cobalt compound and the organoaluminum compound are dissolved in the inert organic solvent containing at least one conjugated diene. Some conjugated dienes that can be used in making the catalyst component solution include 1,3-butadiene, 1,3-pentadiene, isoprene and myrcene. If the preparation is carried out in the absence of a conjugated diene, the resultant catalyst component solution is not effective as a component of the catalyst composition of the present invention. The conjugated diene is preferably used in a ratio by mole of at least 5; more preferably, within the range of 10 to 100; and, most preferably, within the range of 15 to 30, to the amount by mole of the cobalt compound to be used in the catalyst component solution. The preferred conjugated dienes for use in this invention are 1,3-butadiene and isoprene. The most preferred polyene is 1,3-butadiene.

The catalyst component solution is preferably prepared at a temperature of −25° C. to 50° C. and preferably contains 0.0005 to 1.0 moles per liter and more preferably 0.001 to 0.5 moles per liter of the cobalt compound. The temperature at which the catalyst component solution is prepared will more preferably be within the range of −10° C. to 10° C. and it is also highly desirable to use vigorous agitation in the preparation of the catalyst component solution. The ratio by mole of the organoaluminum compound to the cobalt compound is preferably in a range from 0.2 to 50; more preferably, within the range of from 1 to 20; and, most preferably, within the range of 2 to 10.

In the preparation of the catalyst component solution, it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution, the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose a significant amount of the organoaluminum compound.

It is preferable that the catalyst component solution be prepared using a dry (essentially water-free) inert organic solvent. However, a trace of water in the inert organic solvent can be present up to a concentration of about 500 ppm (parts per million by weight). It is preferred for no more than 50 ppm of water to be present in the inert organic solvent used in the preparation of the catalyst component solution. If a sufficient amount of water is present in the inert organic solvent used in the preparation of the catalyst component solution, the catalyst can be completely destroyed. The catalyst component solution will preferably be stored under an inert gas atmosphere, such as nitrogen, in the absence of sunlight or ultraviolet light.

It is desirable to allow the prereaction used in the preparation of the catalyst component solution to run for a period of at least 30 seconds and more preferably for at least 1 minute before mixing the catalyst component solution with the oil, surfactant and water used in making the catalyst emulsion composition. Longer time periods can be used without the catalyst component solution losing its activity. In fact, the catalyst component solution can be stored for many weeks without losing activity if stored under an inert atmosphere.

After the organoaluminum compound has been incorporated in the catalyst component solution using the above-described technique, the catalyst becomes stable to water. This is presumably because of the formation of a π-allyl cobalt active specie. It is believed that it is this π-allyl bonding to the cobalt metal atom that imparts stability to this catalyst component, possibly by providing some hydrophobic shielding of the cobalt atom from water. Stability in polar solvents are well known for π-allyl complexes of other Group VIII transition metals of the periodic table to which cobalt belongs.

In the second step of the suspension polymerization procedure, a reaction mixture is prepared by mixing the catalyst component solution with a 1,3-butadiene/water mixture. The level of oxygen present in the reaction mixture will, of course, be reduced so as to be within the desired range by the addition of an oxygen scavenger or by sparging with an inert gas. A melting-point regulator and a sodium or potassium halide salt can also optionally be added to the reaction mixture at this point in the desired amounts.

A partitioning agent, such as gelatin, can also be included in the reaction mixture to obtain a small polymer particle size. The amount of partitioning agent to be employed will preferably be within the range of about 0.75 to about 1.5 parts by weight per 100 parts by weight of 1,3-butadiene monomer to be polymerized. This 1,3-butadiene/water mixture can contain from as little as about 2 percent butadiene to as much as about 50 percent butadiene by weight. It is preferred for this 1,3-butadiene/water mixture to contain from 15 percent to 35 percent by weight butadiene and it is more preferred for it to contain about 20 to 25 percent butadiene by weight. Since 1,3-butadiene is very volatile, it will be necessary to prepare this mixture in a closed system. Agitation will be provided in the preparation of the reaction mixture in order to insure formation of monomer droplets containing the catalyst component solution are distributed uniformly throughout the mixture. Since 1,3-butadiene is essentially insoluble in water, it will be present in this mixture in the form of droplets which are distributed throughout the mixture. If agitation is discontinued, there will be a separation of the organic and aqueous components of this mixture into two layers. The organic and aqueous layers of this reaction mixture can be mixed together again by agitating the reaction mixture.

In the third step of the suspension polymerization process, a polymerization mixture is prepared by adding carbon disulfide, phenyl isothiocyanate or xanthic acid to the above-described reaction mixture. It is normally preferred to utilize carbon disulfide. The molar ratio of carbon disulfide to 1,3-butadiene monomer will vary between about 1:600 and 1:2800. The molar ratio of carbon disulfide to monomer will preferably be within the range of about 1:1200 to about 1:1400. The molar ratio of monomer to cobalt will be within the range of 2500:1 to 10,000:1 and will preferably be within the range of 4500:1 to 5500:1.

In the final step of the suspension polymerization, the 1,3-butadiene monomer in the polymerization mixture is converted into polybutadiene while agitating the polymerization mixture. If the use of an antioxidant is desired, it may be added conveniently at the beginning of the polymerization. This polymerization of 1,3-butadiene monomer can be carried out at a temperature from about $-20°$ C. to about $60°$ C. It is preferable for the polymerization temperature to be from $-10°$ C. to $40°$ C. The most preferred polymerization temperature is about $0°$ C. to $10°$ C. At temperatures below $0°$ C., an agent which will lower the freezing point of water can be added to the polymerization mixture to keep it from freezing.

This polymerization can be carried out either under a normal pressure or in a pressurized system. This polymerization can be carried out under a nitrogen atmosphere with good results. In any case, steps should be taken to keep additional oxygen from entering the system. Such a polymerization can be run for a period of from about 1 to about 30 hours. It is generally preferred for the polymerization to be run for about 8 to about 10 hours. However, the optimum polymerization time will vary greatly with the polymerization temperature, catalyst, the amount of catalyst used, etc. The polybutadiene formed using the process of this invention will float to the surface of the polymerization mixture and can easily be recovered.

EMULSION POLYMERIZATION

In cases where SPBD is made by emulsion polymerization, a catalyst component solution is made utilizing the same techniques that are employed in making catalyst component solutions for suspension polymerizations. Then, a catalyst emulsion composition is prepared by microfluidizing or microemulsifying the catalyst component solution with an oil, a surfactant and water. In preparing the catalyst emulsion composition, it is highly desirable to first mix the catalyst component solution with the oil and to separately mix the surfactant with the water. The catalyst component solution/oil mixture is then subsequently mixed with the surfactant/water mixture immediately prior to the microfluidization. The ratio of oil to catalyst component solution will normally be within the range of about 0.5 to 30. It is normally preferred for the ratio of oil to catalyst component solution to be within the range of about 1 to about 10 and it is typically most preferred for the oil to catalyst component solution ratio to be within the range of about 2 to about 3. For example, a weight ratio of oil to catalyst component solution of about 2.5:1 is highly preferred.

The weight ratio of water to catalyst component solution utilized in preparing the catalyst emulsion composition is typically within the range of about 5 to about 80. It is normally preferred for the weight ratio of water to catalyst component solution to be within the range of about 10 to about 50. In most cases, it will be more preferred for the weight ratio of water to catalyst component solution utilized in preparing the catalyst emulsion composition to be within the range of about 20 to about 30. For instance, a weight ratio of water to catalyst component solution of about 27:1 is highly preferred for utilization in preparing the catalyst emulsion compositions of this invention. The weight ratio of surfactant to catalyst component solution utilized in preparing the catalyst emulsion composition will typically be within the range of about 0.001 to about 10. In most cases, it will be preferred to utilize a weight ratio of surfactant to catalyst component solution which is within the range of about 0.05 to 5. It is typically more preferred to utilize a ratio of surfactant to catalyst component solution which is within the range of about 0.1 to 0.3. Accordingly, a weight ratio of surfactant to catalyst component solution of about 0.2:1 is highly preferred.

The oil utilized in preparing the catalyst emulsion composition will typically be a long chain paraffinic oil. Such oils will generally be mixtures of various long chain hydrocarbons which contain from about 12 to about 28 carbon atoms. It is generally preferred for these compounds to be saturated. The oil will preferably be comprised of hydrocarbon compounds which contain from about 12 to about 18 carbon atoms. It is possible to utilize long chain alcohols which contain from about 12 to about 28 carbon atoms as the oil. However, it should be noted that such long chain alcohols can act as melting-point regulators. It is, accordingly, necessary to adjust the level of other melting-point regulators employed to attain the desired melting points for the SPBD in cases where long chain alcohols are employed as the oil. It is, of course, also possible to utilize a combination of paraffinic oils and alcohols to adjust the melting point of the SPBD as desired.

The surfactant utilized in preparing the catalyst emulsion composition will normally be an anionic surfactant or a nonionic surfactant. Some representative examples of types of anionic surfactants which can be utilized include carboxylates, alkylbenzene sulfonates, alkane sulfonates, α-olefin sulfonates, fatty alcohol sulfates and oxo-alcohol sulfates. Some representative examples of types of nonionic surfactants which can be utilized include alkylphenol ethoxylates, fatty-alcohol polyethyleneglycol ethers, oxo-alcohol polyethyleneglycol ethers, ethylene oxide polymers, propylene oxide polymers and fatty alcohol polyglycol ethers. It is generally preferred for the surfactant to be an anionic surfactant with alkyl benzene sulfonates, fatty alcohol sulfates and oxo-alcohol ether sulfates being most preferred. The alkyl benzene sulfonates which are utilized generally have the structural formula:

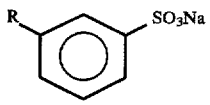

wherein R represents an alkyl group containing from 8 to 18 carbon atoms and preferably wherein R represents an alkyl group containing from 10 to 13 carbon atoms. The fatty alcohol sulfates which can be utilized normally have the structural formula:

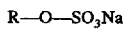

R—O—SO₃Na wherein R represents an alkyl group containing from 6 to 28 carbon atoms and preferably wherein R represents an alkyl group containing from 11 to 17 carbon atoms. The oxo-alcohol ether sulfates which can be utilized generally have the structural formula:

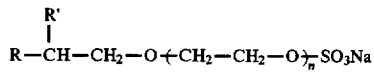

R—CH—CH₂—O—(CH₂—CH₂—O)ₙ—SO₃Na
|
R' wherein n is an integer from 1 to about 4 and wherein R and R' represent alkyl groups which can be the same or different with the total number of carbon atoms in R and R' ranging from about 11 to about 13.

The microfluidization procedure utilized results in the formation of a catalyst emulsion composition which has an average particle size which is within the range of about 10 to about 1,000 nanometers. The catalyst emulsion composition prepared will preferably have an average particle size which is within the range of about 30 to about 600 nanometers and will more preferably have an average particle size which is within the range of about 60 to about 300 nanometers. This microfluidization procedure can be carried out utilizing conventional microfluidizers or other equipment which is capable of homogenizing the catalyst emulsion composition to the desired particle size. For instance, the microfluidization can be carried out utilizing a high pressure pump or series of pumps. Ultrasonic and/or mechanical means can be utilized in the microfluidization procedure. To attain the desired particle size, it may be advantageous to pass the catalyst emulsion composition which is being prepared through the Microfluidizer™ more than one time.

The catalyst component solution utilized in preparing the catalyst emulsion composition is stable over long periods of time and can be stored for long periods without losing its activity. However, it is highly desirable to utilize the catalyst emulsion composition as soon as possible after it is prepared because the catalyst emulsion composition loses its activity over time. In practice, standard catalyst emulsion compositions lose essentially all of their activity after about 24 hours of being stored at room temperature. It is, accordingly, important to use the catalyst emulsion composition as soon as possible after its preparation. However, it is reported in U.S. Pat. No. 5,405,816 that the stability of the catalyst emulsion composition can be greatly improved if it is made with an amino acid soap. In fact, catalyst emulsion compositions which exhibit good activity for 24 hours can be made utilizing amino acid soaps. The amino acid soaps which can be utilized are generally salts of alkyl sarcosines. The alkyl groups in such alkyl sarcosines generally contain from about 8 to about 20 carbon atoms. These salts can be made by neutralization of the alkyl sarcosine with a base such as sodium, potassium, ammonium hydroxide, monoethanolamine, diethanolamine, triethanolamine or the like. Some representative examples of amino acid soaps which can be used include, sodium lauryl sarcosinate, sodium cocoyl sarcosinate, sodium myristoyl sarcosinate, sodium oleoyl sarcosinate and sodium stearoyl sarcosinate. In most cases, sodium lauroyl sarcosinate will be used as the amino acid soap.

The aqueous reaction mixture is prepared by mixing (1) water, (2) at least one emulsifier, (3) 1,3-butadiene monomer, (4) the catalyst emulsion composition, (5) carbon disulfide, phenyl isothiocyanate and/or xanthic acid, (6) optionally, a melting-point regulator and (7) optionally, a potassium halide salt or a sodium halide salt. The level of oxygen present it the aqueous reaction mixture will, of course, be reduced to the desired level by the addition of an oxygen scavenger or by sparging with an inert gas. The amount of 1,3-butadiene monomer in the aqueous reaction mixture will vary from about 2 weight percent to about 50 weight percent. However, in most cases, it will be preferred for the aqueous reaction mixture to contain from about 10 weight percent to about 40 weight percent 1,3-butadiene monomer. It will generally be more preferred for the aqueous reaction mixture to contain from about 20 to about 30 weight percent 1,3-butadiene monomer. The amount of emulsifier utilized in preparing the aqueous reaction mixture will normally be within the range of about 0.1 phm to about 10 phm (parts per hundred parts of monomer). It will normally be preferred for the emulsifier to be present in an amount ranging from about 0.5 phm to about 5 phm. In most cases, it will be more preferred for the emulsifier to be present in an amount within the range of about 1 phm to about 3 phm.

The emulsifiers used in the emulsion polymerization of 1,3-butadiene into SPBD may be charged at the outset of the polymerization or may be added incrementally or by proportioning as the reaction proceeds. In such cases, steps should be taken to keep additional oxygen from entering the reactor. Generally, anionic emulsifier systems provide good results; however, any of the general types of anionic, cationic or nonionic emulsifiers may be employed in the polymerization.

Among the anionic emulsifiers that can be employed in such emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as C10 to C20 straight chain olefins, and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$-OH, wherein R is an alkyl group having from 1 to 20 carbon atoms; sulfonates with intermediate linkages such as ester and ester-linked sulfonates such as those having the formula $RCOOC_2H_4SO_3H$ and $ROOC-CH_2-SO_3H$, wherein R is an alkyl group having from 1 to 20 carbon atoms such as dialkyl sulfosuccinates; ester salts with the general formula:

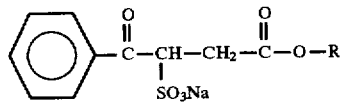

wherein R is an alkyl group having from 1 to 20 carbon atoms; alkylaryl sulfonates in which the alkyl groups contain preferably from 10 to 20 carbon atoms, e.g. dodecylbenzenesulfonates, such as sodium dodecylbenzene sulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Carboxylate emulsifiers are highly preferred. This is because their utilization leads to less build-up on the walls of the polymerization reactor. Fatty acid soaps and rosin acid soaps are representative examples of highly preferred carboxylate soaps. Of rosin acids, about 90 percent are isometric with abietic acid and the other 10 percent is a mixture of dehydro abietic acid and dihydro abietic acid.

Agitation should be provided in the preparation of the aqueous reaction mixture to ensure that the catalyst emulsion composition, the monomer and the surfactant are distributed essentially homogeneously throughout the mixture. Since 1,3-butadiene monomer is very volatile, it will be necessary to prepare the aqueous reaction mixture under pressure in a closed system.

The carbon disulfide, phenyl isothiocyanate or xanthic acid is typically the last component to be added to the aqueous reaction mixture. The addition of the carbon disulfide, phenyl isothiocyanate or the xanthic acid to the reaction mixture which already contains the catalyst emulsion composition will initiate the polymerization reaction. It is normally preferred to utilize carbon disulfide. The amount of carbon disulfide that can be added will vary between 0.005 phm and 2 phm. More preferably, the amount of carbon disulfide added will vary between 0.001 and 1 phm.

In the process of the present invention, the larger the proportion of the carbon disulfide in a range from about 0.0005 phm to about 0.5 phm in the polymerization mixture, the larger the yield of the SPBD obtained from the polymerization mixture. However, too large an amount of carbon disulfide, for example, larger than about 0.5 phm, causes a decrease in the polymer yield.

The 1,3-butadiene monomer is polymerized into SPBD while agitating the polymerization mixture. If the use of an antioxidant is desired, it may be added conveniently at the beginning of the polymerization. This polymerization of 1,3-butadiene monomer can be carried out at a temperature from about –20° C. to about 90° C. It is preferable for the polymerization temperature to be from –10° C. to 40° C. The most preferred polymerization temperature is about 0° C. to about 10° C. At temperatures below 0° C., an antifreeze agent can be added to the polymerization mixture to keep it from freezing.

This polymerization can be carried out either under a normal pressure or in a pressurized system. This polymerization can be carried out under an inert gas atmosphere, such as a nitrogen atmosphere, with good results. Such a polymerization can be run for a period of from about 3 to about 30 hours. It is generally preferred for the polymerization to be run for a period which is within the range of about 10 to 16 hours. However, the optimum polymerization time will vary greatly with the polymerization temperature, catalyst, the amount of catalyst used, etc. In most cases, the optimum polymerization time will be within the range of about 12 to about 14 hours.

After the polymerization has been completed, the SPBD can be recovered from the latex by standard coagulation techniques. For instance, coagulation can be accomplished by adding acids or blends of salts with acids to the latex. For example, sulfuric acid, hydrochloric acid, blends of sodium chloride with sulfuric acid and blends of hydrochloric acid with methanol are very effective as coagulating agents. Calcium chloride solutions and blends of calcium chloride with various acids can also be utilized as coagulants. Salt/acid coagulants are generally preferred. For instance, the utilization of sulfuric acid with sodium chloride or potassium chloride as the coagulant will lead to good results. Barium chloride and magnesium sulfate are additional examples of divalent salts which are suitable for utilization in coagulating the SPBD latex. It may also be advantageous to employ materials classified as coagulation aids, such as high molecular weight polyelectrolytes, in the coagulation of the SPBD latex. The preferred coagulation aids are weak bases. Some representative examples of suitable coagulation aids which can be used include Nalco™ 108 (Nalco Chemical Company), Daxad™ CP-1 (W. R. Grace and Company) and similar materials that are also weakly basic polyelectrolytes. The quantity of coagulant required will vary with the emulsifier, the amount of emulsifier used, the rubber being coagulated and the type of coagulant being employed. Generally, the optimum type of coagulant, quantity of coagulant and coagulating conditions can be determined using a trial-and-error approach.

The following working examples illustrate various embodiments of the process of the present invention. These examples are intended merely to illustrate the present invention and not in any sense to limit the scope in which the present invention can be practiced. Unless specifically indicated otherwise, parts and percentages are given by weight.

EXAMPLE 1

In this experiment, a SPBD was synthesized in an aqueous medium by suspension polymerization utilizing the technique of this invention. In the procedure used, an antioxidant solution was prepared by mixing 17 grams of Irganox antioxidant. 6.8 of 2.2'-methylene bis(4-methyl-6-tertiarybutyl phenol, 6.8 grams of 2,5-di-t-pentylhydroquinone, 6.8 grams of ammonium lauroyl sarcosinate solution and 510 grams of water. A suspension solution was made by mixing 10,812 grams of water, 75.48 grams of polyacrylic copolymer and 10 grams of potassium hydroxide. A catalyst solution was made by mixing 13.44 grams of triisobutylaluminum, 3.36 grams of cobalt octanoate, 7.47 grams of 1,3-butadiene and 102.82 grams of hexane. An activator solution was made by mixing 1.28 grams of carbon disulfide and 1788.4 grams of water. Finally, a monomer solution was made by mixing 680 grams of hexane, 8.16 grams of N,N-dibutylformamide and 1859.8 grams of 1,3-butadiene.

The antioxidant solution, 40 percent of the suspension solution, 40 percent of the activator solution and 0.01 phm of sodium hydrosulfite (as an oxygen scavenger) were initially charged into a 10-gallon reactor which was maintained at a temperature of 50° F. (100° C.) and agitated. Then, the remaining suspension solution, the remaining activator solution, the catalyst solution and the monomer solution were continuously fed into the reactor over a period of 2 hours. The suspension solution was fed into the reactor at a flow rate of 54.44 grams per minute, the catalyst solution was fed at a flow rate of 1.06 grams per minute, the activator solution was fed at a flow rate of 8.96 grams per minute and the monomer solution was fed at a flow rate of 21.23 grams per minute. The sodium hydrosulfite oxygen scavenger reduced the level of oxygen in the aqueous polymerization medium to about 0.2 ppm.

The SPBD made by this aqueous polymerization technique formed large beads which were easy to handle and which could be held by a 20 mesh screen. Fouling did not occur during the polymerization procedure.

COMPARATIVE EXAMPLE 2

The procedure utilized in Example 1 was repeated in this experiment except for the fact that sodium hydrosulfite was not added to the aqueous polymerization medium as an oxygen scavenger. The polymerization medium accordingly contained about 8–9 ppm of dissolved oxygen which is typical for conventional suspension polymerization procedures. In this experiment, severe reactor fouling occurred.

This comparative experiment showed that reactor fouling can be a serious problem in conventional suspension polymerizations which are utilized in the synthesis of SPBD. By utilizing the technique of this invention, Example 1 shows that the problem of reactor fouling can be greatly reduced or eliminated.

By utilizing the technique of this invention to keep the amount of oxygen present in an aqueous polymerization medium within the range of about 0.1 ppm to about 0.3 ppm, it was possible to conduct such a suspension polymerization in a 10-gallon reactor continuously for over 4 weeks without the need to clean the reactor due to fouling. This is in contrast to conventional suspension polymerizations where it is necessary to clean the reactor every day to eliminate the build-up of polymer due to fouling.

EXAMPLE 3

The procedure utilized in Example 1 was repeated in this experiment except that the amount of sodium hydrosulfite added to the polymerization medium was increased to 0.1 phm. This resulted in the amount of dissolved oxygen in the aqueous polymerization medium being reduced to below 0.1 ppm. No reactor fouling was observed. However, the SPBD made was in the form of a fine powder (about 80 mesh). This experiment shows that the particle size of the SPBD can be controlled by regulating the amount of oxygen which is dissolved in the aqueous polymerization medium.

While certain representative embodiments and details have been shown for the purpose of illustrating the subject invention, it will be apparent to those skilled in this art that various changes and modifications can be made therein without departing from the scope of this invention.

What is claimed is:

1. A process for preparing syndiotactic 1,2-polybutadiene in an aqueous medium with minimal reactor fouling which comprises polymerizing 1,3-butadiene monomer in the aqueous medium in the presence of (1) a catalyst system which is comprised of (a) transition metal compound, (b) an organoaluminum compound and (c) at least one member selected from the group consisting of carbon disulfide, phenyl isothiocyanate and xanthic acid, and (2) from about 0.01 ppm to about 4 ppm of oxygen.

2. A process as specified in claim 1 wherein said polymerization is a suspension polymerization.

3. A process as specified in claim 2 wherein the level of oxygen in the aqueous medium is reduced to be within the range of about 0.01 ppm to about 4 ppm by the addition of an oxygen scavenger.

4. A process as specified in claim 3 wherein the oxygen scavenger is selected from the group consisting of sulfites, hydrogen sulfites, dithionates, hydroquinone, catechol, resorcinol, hydrazine, pyrogallol, gallate, ascorbic acid, ascorbate, isoascorbic acid, isoascorbate, glucose, lignin, dibutylhydroxytoluene, butylhydoxyanisole, ferrous salts, metal powders, sodium thiosulfate, sodium alum, disodium hydrogen phosphate, activated clay, mordenite, hydroxylamine, diethylhydroxylamine and thiourea.

5. A process as specified in claim 3 wherein the oxygen scavenger is selected from the group consisting of sodium sulfite, sodium thiosulfite, sodium hydrosulfite, sodium thiosulfate and sodium metabisulfite.

6. A process as specified in claim 3 wherein the oxygen scavenger is an alkali metal sulphite.

7. A process as specified in claim 3 wherein the oxygen scavenger is an alkali metalsulfate.

8. A process as specified in claim 3 wherein the oxygen scavenger is sodium hydrosulfite.

9. A process as specified in claim 2 wherein the level of oxygen in the aqueous medium is reduced to be within the range of about 0.01 ppm to about 4 ppm by sparging with an inert gas.

10. A process as specified in claim 9 wherein said inert gas is nitrogen.

11. A process as specified in claim 2 wherein the oxygen is present in said aqueous medium at a level which is within the range of about 0.05 ppm to about 1 ppm.

12. A process as specified in claim 2 wherein the oxygen is present in said aqueous medium at a level which is within the range of about 0.1 ppm to about 0.3 ppm.

13. A process as specified in claim 2 wherein the oxygen is present in said aqueous medium at a level which is within the range of about 0.1 ppm to about 4 ppm.

14. A process as specified in claim 2 wherein the oxygen is present in said aqueous medium at a level which is within the range of about 0.1 ppm to about 1 ppm.

15. A process as specified in claim 3 wherein said member selected from the group consisting of carbon disulfide, phenyl isothiocyanate and xanthic acid is carbon disulfide.

16. A process for preparing syndiotactic 1,2-polybutadiene in an aqueous medium with a minimal amount of reactor fouling which comprises polymerizing 1,3-butadiene monomer in an aqueous medium in the presence of (1) a catalyst composition which is made by reacting (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, (b) at least one organoaluminum compound of the formula $AlR_3$, wherein R represents a hydrocarbon radical of 1 to 6 carbon atoms and (c) at least one conjugated diene; (2) at least one member selected from the group consisting of carbon disulfide, phenyl isothiocyanate and xanthic acid; and (3) from about 0.01 ppm to about 4 ppm of oxygen.

17. A process as specified in claim 16 wherein said polymerization is a suspension polymerization; and wherein the level of oxygen in the aqueous medium is reduced to be within the range of about 0.01 ppm to about 4 ppm by the addition of an oxygen scavenger.

18. A process as specified in claim 17 wherein the aqueous medium is further comprised of a melting-point regulator.

19. A process as specified in claim 18 wherein the melting-point regulator is selected from the group consisting of ketones, aldehydes, alcohols, esters, nitrites, sulfoxides, amides and phosphoric acid esters.

20. A process as specified in claim 19 wherein said cobalt compound is a cobalt salt of an organic carboxylic acid containing from 6 to 15 carbon atoms; wherein said member selected from the group consisting of carbon disulfide, phenyl isothiocyanate and xanthic acid is carbon disulfide; and wherein said polymerization is conducted at a temperature which is within the range of about −10° C. to about 400° C.

* * * * *